US010495165B2

(12) United States Patent
Mallmann

(10) Patent No.: US 10,495,165 B2
(45) Date of Patent: Dec. 3, 2019

(54) DISC BRAKE FOR A MOTOR VEHICLE, COMPRISING A PLASTICALLY DEFORMABLE RESTORING SPRING, AND RESTORING SPRING

(71) Applicant: Lucas Automotive GmbH, Koblenz (DE)

(72) Inventor: Markus Mallmann, Pfalzfeld (DE)

(73) Assignee: Lucas Automotive GmbH, Koblenz (DE)

( * ) Notice: Subject to any disclaimer, the term of this patent is extended or adjusted under 35 U.S.C. 154(b) by 441 days.

(21) Appl. No.: 15/090,050

(22) Filed: Apr. 4, 2016

(65) Prior Publication Data

US 2016/0215842 A1    Jul. 28, 2016

Related U.S. Application Data

(63) Continuation of application No. 14/423,217, filed as application No. PCT/EP2013/067451 on Aug. 22, 2013, now Pat. No. 9,528,564.

(30) Foreign Application Priority Data

Aug. 23, 2012  (DE) ........................ 10 2012 016 737

(51) Int. Cl.
  *F16D 65/54*  (2006.01)
  *F16D 65/097*  (2006.01)
  (Continued)

(52) U.S. Cl.
  CPC ........... *F16D 65/543* (2013.01); *B21D 53/36* (2013.01); *F16D 55/225* (2013.01);
  (Continued)

(58) Field of Classification Search
  CPC ............ F16D 65/0977; F16D 65/0978; F16D 65/0006; F16D 65/0979; F16D 2055/0041; F16D 2065/1396; F16D 65/097
  (Continued)

(56) References Cited

U.S. PATENT DOCUMENTS 4,171,037 A * 10/1979 Souma ................ F16D 65/0972
                                                188/73.34
4,364,455 A   12/1982 Oshima
(Continued)

FOREIGN PATENT DOCUMENTS

DE    3023103 A1   1/1981
DE    3538320 A1   4/1986
(Continued)

*Primary Examiner* — Bradley T King
*Assistant Examiner* — Mahbubur Rashid
(74) *Attorney, Agent, or Firm* — MacMillan, Sobanski & Todd, LLC

(57) ABSTRACT

A disc brake for a motor vehicle brake system and a restoring spring arranged therein, the disc brake comprising the following: a brake support which has at least one receiving region; a brake lining arrangement which has a brake lining support and a brake lining which is attached to the brake lining support and which can be brought into interaction with a brake disc in order to achieve a braking effect, wherein the brake lining arrangement is received in the at least one receiving region in a guided manner via a guiding portion formed on the brake lining support; and at least one restoring spring which engages the brake lining arrangement and biases the brake lining arrangement under elastic deformation into a starting position that does not produce a braking effect. The at least one restoring spring can be plastically deformed in order to compensate for brake lining wear. To improve the wear compensation by means of the restoring spring, rests against the brake support via a
(Continued)

base portion and has at least one limb which is connected to the base portion via a connecting region and which is arranged at an angle relative to the base portion, the angle changing under the effect of plastic deformation as the brake lining wear increases.

5 Claims, 6 Drawing Sheets

(51) Int. Cl.
*F16D 55/226* (2006.01)
*F16D 65/18* (2006.01)
*B21D 53/36* (2006.01)
*F16D 65/06* (2006.01)
*F16D 65/092* (2006.01)
*F16D 55/225* (2006.01)
*F16D 55/02* (2006.01)
*F16D 55/00* (2006.01)

(52) U.S. Cl.
CPC ........... *F16D 55/226* (2013.01); *F16D 65/06* (2013.01); *F16D 65/092* (2013.01); *F16D 65/0977* (2013.01); *F16D 65/0978* (2013.01); *F16D 65/18* (2013.01); *F16D 65/183* (2013.01); *F16D 55/02* (2013.01); *F16D 2055/0075* (2013.01); *Y10T 29/49* (2015.01); *Y10T 29/49611* (2015.01)

(58) Field of Classification Search
USPC ....................................... 188/73.38
See application file for complete search history.

(56) References Cited

U.S. PATENT DOCUMENTS

| | | | | |
|---|---|---|---|---|
| 4,371,060 A * | 2/1983 | Iwata | ................. | F16D 65/0972 188/73.38 |
| 4,512,446 A * | 4/1985 | Chuwman | ......... | F16D 55/22655 188/264 G |
| 5,025,897 A * | 6/1991 | Hirashita | .............. | F16D 55/226 188/250 B |
| 5,125,482 A * | 6/1992 | Negishi | ............... | F16D 65/0972 188/73.38 |
| 5,251,727 A | 10/1993 | Loeffler et al. | | |
| 5,549,181 A | 8/1996 | Evans | | |
| 5,947,233 A * | 9/1999 | Kobayashi | ........... | F16D 55/227 188/1.11 W |
| 7,040,464 B1 * | 5/2006 | Andrews | ............ | F16D 65/0977 188/73.38 |
| 7,219,773 B2 * | 5/2007 | Ono | .................... | F16D 65/0971 188/250 E |
| 7,318,503 B2 | 1/2008 | Farooq | | |
| 7,798,294 B2 | 9/2010 | Iraschko | | |
| 8,020,674 B2 | 9/2011 | Miura et al. | | |
| 8,376,092 B2 * | 2/2013 | Lethorn | .............. | F16D 65/0977 188/72.3 |
| 8,393,441 B2 | 3/2013 | Gutelius | | |
| 8,439,171 B2 * | 5/2013 | Kaneko | ............... | F16D 65/0977 188/72.3 |
| 8,540,060 B2 * | 9/2013 | Hayashi | ................ | F16D 65/097 188/1.11 W |
| 8,636,119 B2 * | 1/2014 | Bach | ..................... | F16D 65/097 188/72.3 |
| 8,684,148 B2 | 4/2014 | Wakabayashi et al. | | |
| 8,869,950 B2 * | 10/2014 | Maehara | ............... | F16D 55/227 188/73.38 |
| 9,016,442 B2 * | 4/2015 | Odaira | .................. | F16D 55/226 188/72.3 |
| 2004/0104086 A1 | 6/2004 | Katoh | | |
| 2004/0222053 A1 * | 11/2004 | Wemple | .............. | F16D 65/0977 188/73.38 |
| 2005/0236236 A1 * | 10/2005 | Farooq | ................ | F16D 65/0974 188/73.31 |
| 2005/0274579 A1 * | 12/2005 | Nogiwa | .............. | F16D 65/0972 188/73.38 |
| 2007/0251772 A1 | 11/2007 | Tsurumi | | |
| 2009/0159376 A1 * | 6/2009 | Rossignol | ............. | F16D 65/095 188/73.38 |
| 2010/0147635 A1 * | 6/2010 | Hayashi | ............... | F16D 65/0972 188/73.38 |
| 2011/0168503 A1 | 7/2011 | Chelaidite | | |
| 2012/0186918 A1 | 7/2012 | Wakabayashi et al. | | |
| 2012/0205205 A1 * | 8/2012 | Lethorn | .............. | F16D 65/0972 188/234 |
| 2012/0222925 A1 * | 9/2012 | Kaneko | ............... | F16D 65/0977 188/73.38 |
| 2013/0192939 A1 * | 8/2013 | V | ........................ | F16D 65/0972 188/73.38 |
| 2014/0318905 A1 * | 10/2014 | Merrien | .............. | F16D 55/2265 188/73.38 |
| 2014/0326548 A1 * | 11/2014 | Merrien | .............. | F16D 65/0006 188/73.38 |
| 2014/0345984 A1 * | 11/2014 | Kamiya | ............... | F16D 65/0006 188/73.38 |
| 2015/0021127 A1 * | 1/2015 | Miura | ................. | F16D 65/0977 188/73.38 |

FOREIGN PATENT DOCUMENTS

| | | |
|---|---|---|
| DE | 10320605 B3 | 11/2004 |
| DE | 102009022633 A1 | 10/2010 |
| DE | 112010003825 T5 | 7/2012 |
| EP | 0560146 A2 | 9/1993 |
| GB | 854813 | 11/1960 |
| JP | 2002327780 A | 11/2002 |
| JP | 2008241046 A | 10/2008 |

\* cited by examiner

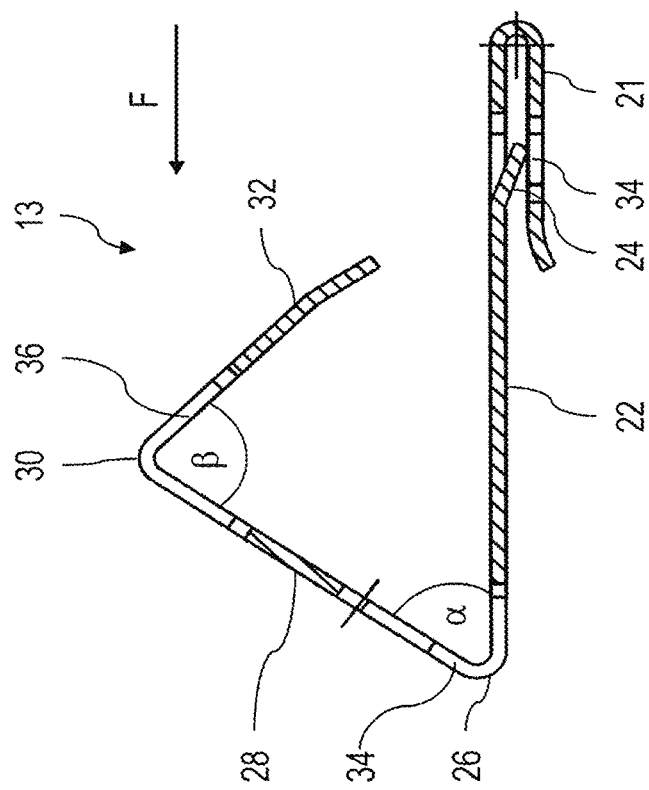
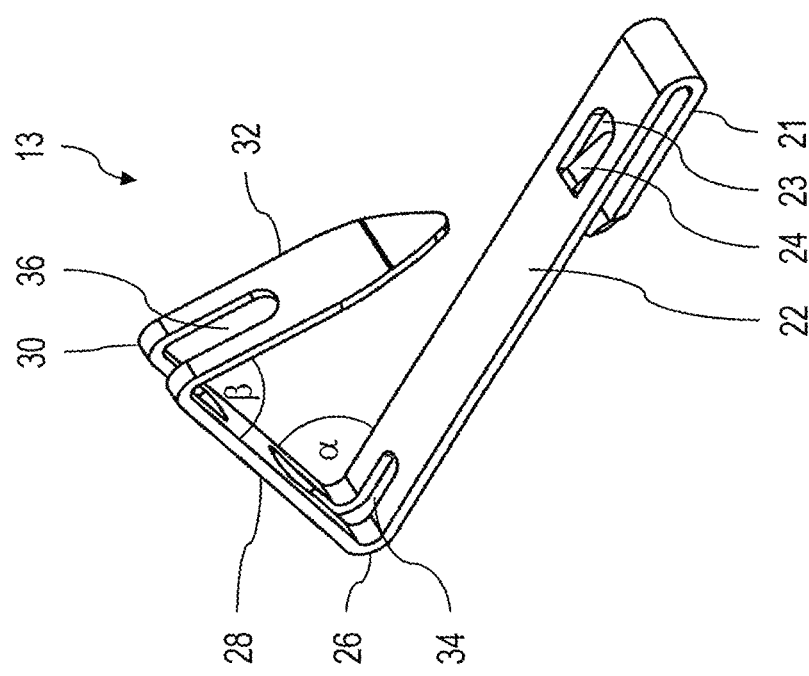
Fig. 6
Fig. 5

DISC BRAKE FOR A MOTOR VEHICLE, COMPRISING A PLASTICALLY DEFORMABLE RESTORING SPRING, AND RESTORING SPRING

CROSS-REFERENCE TO RELATED APPLICATIONS

This application is a continuation of U.S. patent application Ser. No. 14/423,217, Feb. 23, 2015, the disclosures of which are incorporated herein by reference in entirety, which is the national stage of International Application No. PCT/EP2013/067451 filed Aug. 22, 2013, the disclosures of which are incorporated herein by reference in entirety, and which claimed priority to German Patent Application No. 10 2012 016 737.7 filed Aug. 23, 2012, the disclosures of which are incorporated herein by reference in entirety.

BACKGROUND OF THE INVENTION

The present invention relates to a disc brake for a motor vehicle brake system, comprising a brake support which has at least one receiving region; a brake lining arrangement which has a brake lining support and a brake lining which is attached to the brake lining support and which can be brought into interaction with a brake disc in order to achieve a braking effect, wherein the brake lining arrangement is received in the at least one receiving region in a guided manner via a guiding portion formed on the brake lining support; and at least one restoring spring which engages the brake lining arrangement and biases the brake lining arrangement under elastic deformation into a starting position that does not produce a braking effect, wherein the at least one restoring spring can be plastically deformed in order to compensate for brake lining wear.

Such disc brakes are prior art. In these disc brakes the brake lining support, after a deflection from its starting position that produces a braking effect whereby it moves into frictional contact with a brake disc, has to be moved back into the starting position in order to separate the brake lining from the brake disc. In order to avoid unnecessary wear and reduce consumption, after the brake lining arrangement has been deflected so as to produce a braking effect it is absolutely necessary to prevent any contact from remaining between brake lining and brake disc and any residual sliding moments from arising.

However, as is likewise generally known, it is necessary to configure the disc brake in such a way that in the event of wear at the brake linings a wear correction may be effected so that, despite the occurrence of lining wear, the behaviour of the disc brake upon actuation remains substantially constant. Such wear correction entails adjusting the restoring spring in accordance with the wear. For this purpose there are solutions, whereby in the receiving region the restoring spring may effect a sliding adjustment in accordance with the actual wear situation. Other solutions provide that the restoring spring deforms, in particular plastically deforms, in the receiving region in accordance with the actual wear. Such a solution is described for example in the document U.S. Pat. No. 7,318,503 B2. Here, the brake lining arrangement is biased into its starting position by means of a loop-shaped restoring spring, wherein the loop-shaped restoring spring is configured so as also to guarantee a lining wear compensation by means of a plastic deformation component.

It has however been shown that such solutions do not exhibit reliable behaviour during wear compensation. In particular, it is difficult to predict whether a plastic deformation of the spring curve always corresponds precisely to the actual wear state. A consequence of this is that with progressive brake lining wear in practice the restoring behaviour of the restoring spring may also vary. This may lead to the spring being for example overly deformed, with the result that the remaining elastic deformation component no longer provides an adequate restoring movement and residual sliding moments occur. On the other hand it is equally possible for the spring to be insufficiently plastically deformed, with the result that it provides a greater restoring travel than is desired. This leads to a delayed response behaviour of the brake upon renewed actuation.

BRIEF SUMMARY OF THE INVENTION

In contrast to this it is a feature of the present invention to provide a disc brake of the type described in the introduction, the restoring spring of which provides reliable wear compensation combined with constant restoring behaviour.

This feature is achieved by a disc brake of the type described in the introduction, in which it is provided that the restoring spring rests against the brake support via a base portion and has at least one limb which is connected to the base portion via a connecting region and which is arranged at an angle relative to said base portion, said angle changing under the effect of plastic deformation as the brake lining wear increases.

Instead of a harmonically round-shaped spring curve the invention provides that in the connecting region a solid formation portion is provided, in which the plastic deformation for wear correction occurs. This allows the plastic deformation behaviour to be adjusted in a more defined manner.

A development of the invention provides that the restoring spring is configured with at least two limbs disposed at an angle relative to one another, wherein with increasing lining wear the angle between the two limbs varies for the purpose of wear compensation.

The wear compensation under the effect of plastic deformation of the restoring spring therefore takes place in the at least one connecting region between base portion and the at least one limb and/or—in the case of at least two limbs—additionally or alternatively in the connecting region between the two adjacent limbs, wherein said connecting regions are clearly defined. Consequently, given a suitable configuration of the connecting regions, a more detailed description of which will be given below, the deformation behaviour of the spring may be adjusted purposefully and reliably for wear compensation.

In principle it is possible to subject the spring to tensile loading, wherein the at least one limb is deformed with simultaneous reduction of the angle that the limb forms with the base portion. If at least two adjacent limbs are provided, these are spread with simultaneous widening of the angle formed thereby. As an alternative to this, according to the invention it is preferably provided that the restoring spring is disposed in such a way between the brake support and the brake lining arrangement that it is subject to compression loading, wherein with increasing brake lining wear the angle between the at least one limb and the base portion becomes larger under the effect of plastic deformation. If two adjacent limbs are provided, the angle between them becomes smaller under the effect of plastic deformation and the adjacent limbs move closer to one another. This variant of the spring that is elastic under compression has the advantage that the adjacent limbs under the effect of increasing wear compensation move closer to one another and finally, given maximum deformation (plastic and elastic), place themselves against one another. Upon release of the brake, a restoring movement within the scope of the elastic deformation component occurs. The plastic (permanent) deformation component is used for wear compensation.

A development of the invention provides that the restoring spring in the connecting regions between two adjacent limbs or between the at least one limb and the base portion as well as close to said connecting regions is provided in each case with a recess, wherein the limbs remote from the connecting regions are designed free of recesses. By suitably dimensioning the length and/or breadth of the recess in the connecting regions the deformation behaviour in said connecting regions may be purposefully controlled. Larger recesses provide a greater weakening of the connecting regions and hence a lower deformation limit. By deformation limit in the present context is meant the transition from a state of elastic deformation to a state of plastic deformation. Smaller recesses provide a higher deformation limit, i.e. greater forces are needed to obtain a plastic deformation in a connecting region. The designing of the connecting regions with recesses has the further advantage that it allows a purposeful adjustment of the deformation behaviour to be effected with a low manufacturing outlay. In summary it is therefore possible for the desired deformation limit of a connecting region between elastic and plastic deformation to be determinable by dimensioning the size of the recess in the connecting region.

As regards the structural design of the restoring spring it may be provided that the connecting region of the limb connected to the base portion has a different deformation limit than the connecting region between adjacent limbs. The limb close to the base portion therefore plastically deforms, so to speak, later than the limb disposed further away from the base portion.

In this connection it may further be provided that the connecting regions between adjacent limbs with increasing spacing from the base portion are configured with a deformation limit of unequal value, preferably of decreasing value. It is however also possible to provide alternating deformation limits in successive connecting regions.

As regards the structure of the restoring spring it may further be provided that the at least one connecting region is of a substantially harmonically rounded construction, albeit with a small radius. The harmonic rounding prevents an undesirable fracture of the restoring spring and guarantees a long service life. In addition it may be provided that the limbs are of a substantially rectilinear construction.

According to the invention it is in principle possible that the restoring spring takes the form of a separate component and is fastenable relative to the brake support, preferably by means of a detent connection or a clip connection. This allows easy manufacture as a bent stamping from a spring steel sheet or the like. It is however also possible for the restoring spring to be attached to a guide clip for guiding the brake lining support, which guide clip is accommodated in the receiving region. In this connection it may be provided that the restoring spring is latched and/or clamped on the guide clip by means of a detent connection, wherein the guide clip for this purpose has a recess. Alternatively it is possible for the restoring spring to be formed integrally on the guide clip. This facilitates the handling of restoring spring and guide clip as a unit during assembly and logistics.

In this connection it may further be provided according to the invention that the unit of restoring spring and guide clip is manufactured by shaping a flat component, wherein the restoring spring and the guide clip are manufactured in each case by shaping an, in the flat state, substantially elongate portion of the flat component, wherein the respective longitudinal axes of the elongate portions run substantially parallel to one another. As a flat component preferably a metal sheet may be considered, which in the course of cutting- or stamping processes is provided with desired contours and recesses and which is then shaped in the course of bending processes. By virtue of the construction according to the invention of restoring spring and guide clip as elongate portions of the flat component and by virtue of parallel arrangements of the respective longitudinal axes of said portions the dimensions of the flat component may be kept extremely small. This accordingly reduces the surface area of material needed to manufacture the flat component and hence the material scrap that arises, with the result that the cost of manufacture may be markedly reduced.

The invention further relates to a restoring spring for a disc brake of the previously described type, wherein all of the above features pertaining to the restoring spring and the mounting thereof may be provided individually or in any desired combination thereof.

Other advantages of this invention will become apparent to those skilled in the art from the following detailed description of the present embodiments, when read in light of the accompanying drawings.

BRIEF DESCRIPTION OF THE DRAWINGS

FIG. 5 is a component drawing of the restoring spring according to the first embodiment;

FIG. 6 is a sectional view of the restoring spring of FIG. 5 according to the first embodiment;

DETAILED DESCRIPTION OF THE INVENTION

Figure 1:
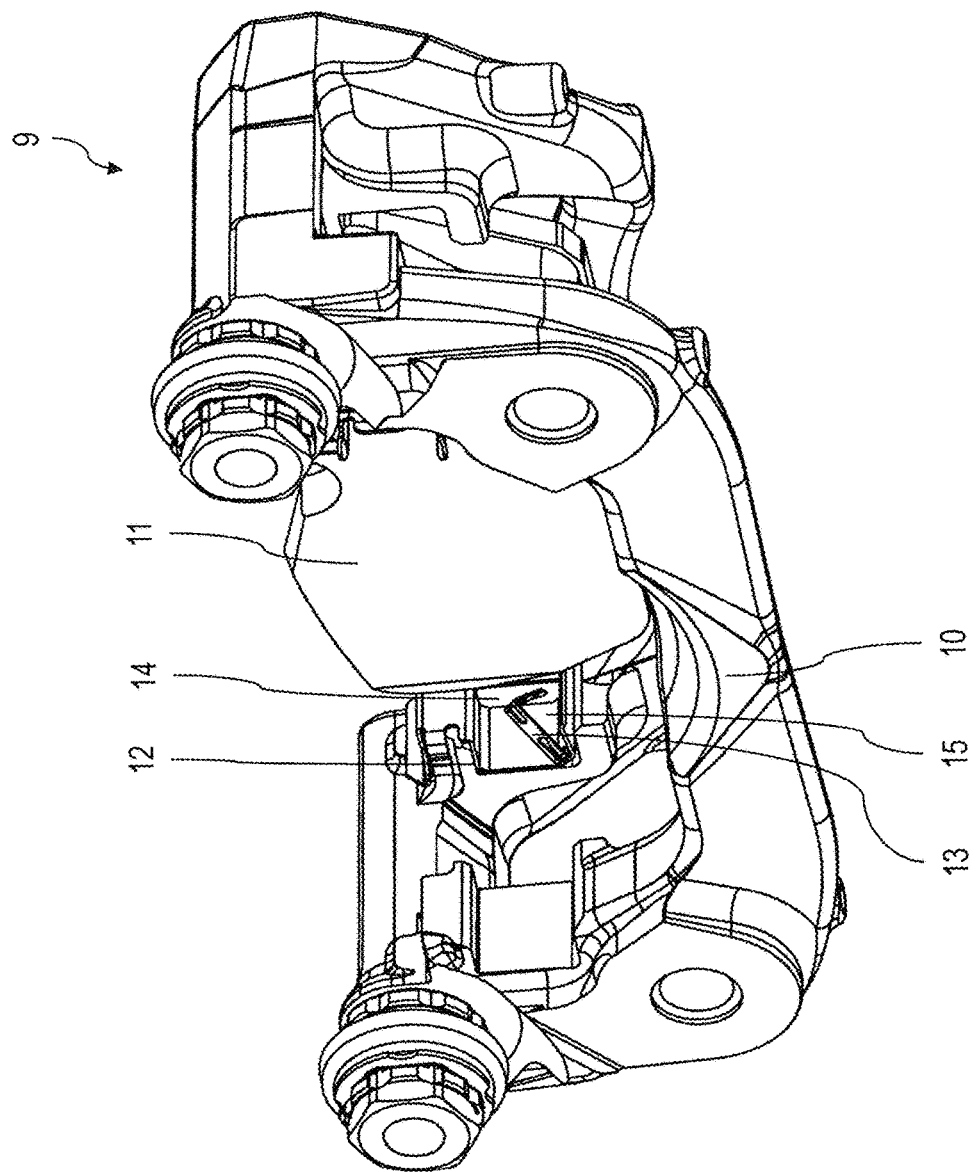
FIG. 1 is a three-dimensional view of the disc brake.

In FIG. 1 a disc brake according to the invention is shown and denoted generally by 9. Here, in a U-shaped brake support 10 a brake lining arrangement 11 is disposed and guided in a displaceable manner in a receiving region 12 in the brake support 10. Inside the receiving region 12 a restoring spring 13 is disposed. In the illustrated embodiment said spring is provided substantially inside a guide clip 15, which is disposed in the receiving region 12. The restoring spring 13 abuts a laterally projecting guiding portion 14 of the brake lining arrangement 11. In order to build up a braking force the brake lining arrangement 11 is moved by components, which are not represented in detail, in an as such known manner in the receiving region 12. The restoring spring 13 in this case in accordance with the displacement travel of the brake lining arrangement 11 deforms initially elastically in accordance with the forces acting upon it. After cancelling of the actuating force acting upon the brake lining arrangement 11, the restoring spring 13 may by means of an elastic spring-back move the brake lining arrangement 11 back into the starting position, hereinafter also referred to as restoring position. In the present case, in the opposite region of the brake support 10 a non-illustrated, identical assembly group comprising a corresponding restoring spring 13 is disposed.

During the service period of the disc brake 9 a brake lining, which is situated on parts of the surface of the brake lining arrangement 11 facing the restoring spring 13, is eroded by wear. In order that the response behaviour of the disc brake 9 remains constant, such wear is typically compensated by means of a wear correction corresponding to the actual brake lining wear. In this case the brake lining arrangement 11 is permanently displaced forward in the direction of the restoring spring 13 and/or in actuating direction. The starting position and/or restoring position of the brake lining arrangement 11 is likewise to be adapted by means of a wear correction to the increasing brake lining wear and/or to a compensating forward displacement of the brake lining arrangement 11. This means that the starting position and/or restoring position is likewise to be changed for the purpose of wear compensation. The restoring spring 13 according to the invention solves this problem of wear compensation in that as a result of the plastic deformation following an increased action of force it shifts its point of application on the brake lining arrangement 11 in the elastically non-deformed state and hence the ensuing restoring position in actuating direction of the brake lining arrangement 11. There now follows a detailed description of this operation with reference to a first embodiment that is represented in FIGS. 2 to 6. An increased action of force is achieved for example when, because of the incipient wear, upon a brake actuation a greater movement of the brake lining arrangement 11 occurs and hence the restoring spring 13 is deformed to a greater extent. This deformation comprises a reversible elastic component and a permanent plastic component.

Figure 2:
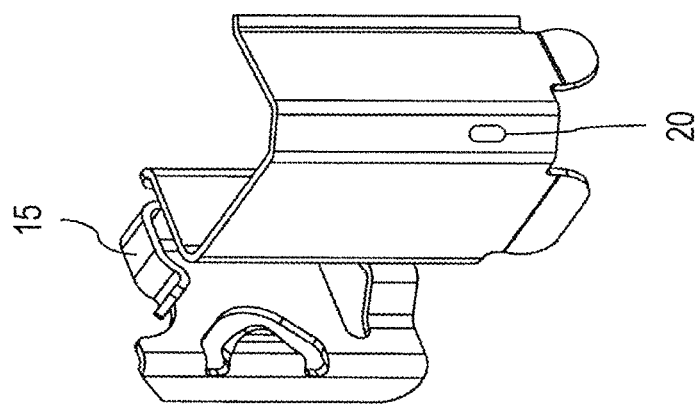
FIG. 2 is a perspective view of a guide clip for guiding the brake lining support.

FIG. 2 shows a guide clip 15, which is disposed in the receiving regions 12 of the brake lining support 10. Such guide clips are as such prior art. They are used to guide the brake lining arrangement in a defined manner in the brake support. For the disc brake 9 according to the invention the recess 20 is additionally provided.

Figure 4:
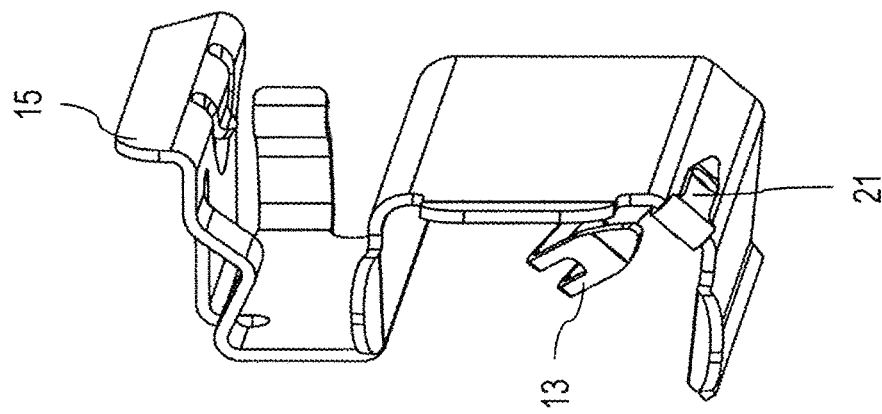
FIGS. 3 and 4 are perspective views of the guide clip of FIG. 2 with a restoring spring according to a first embodiment of the invention fastened thereto.
Figure 3:
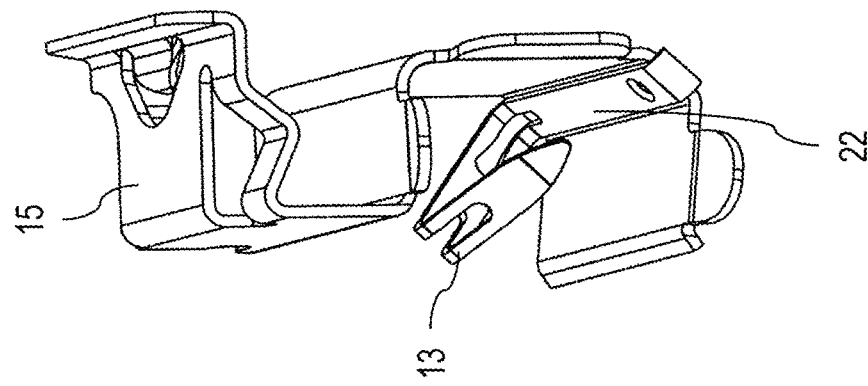

FIGS. 3 and 4 show a first embodiment of the restoring spring 13, which takes the form of a separate component and is fastened to the guide clip 15. For this purpose, it engages by means of a detent lug 24 into the recess 20 of the guide clip 15 and embraces a part of the guide clip 15 by means of a clamping portion 21. In this case the clamping portion 21 interacts in such a way with an adjoining, opposing base portion 22 that said portions are spread elastically upon being pushed onto the retaining region of the guide clip 15. The restoring spring 13 is therefore clamped firmly on the guide clip 15. It is alternatively possible for such a fastening of the restoring spring to be effected without a guide clip directly on the brake lining support 10.

FIG. 5 shows a detailed view of the restoring spring 13 according to the first embodiment. Here, the restoring spring has the previously described clamping portion 21, which verges at an angle of approximately 180° into the base portion 22, so that these two portions run substantially parallel to one another. Provided in the base portion 22 is a recess 23, from which a detent lug 24 projects in the direction of the clamping portion 21. Connected to the base portion 22 by a first connecting region 26 is a first limb 28. This verges via a connecting region 30 into a second limb 32. The transitions from the base portion 22 to the limb 28 as well as between the limbs 28 and 32 are denoted respectively by angles α and β, which are produced by bending the limbs 28 and 32 out from an initially flat metal sheet in the direction of the side of the base portion 22 remote from the clamping portion 21. The resulting transitions are in this case deliberately of a harmonic and not, say, sharp-edged design in order to avoid concentrations of stress.

FIG. 6 shows a sectional view of the restoring spring 13, wherein the section axis extends parallel to the direction of motion of the brake lining arrangement 11. The opposing portions 21 and 22 in this case verge in such a way into one another that the spacing between them is smaller than the material thickness of a corresponding counterpart (region of a guide clip 15 or of the brake lining support 10). These portions upon being pushed onto the corresponding counterpart are accordingly spread elastically apart and firmly clamp the restoring spring 13 thereon. Opposite the detent lug 24 in the clamping portion 21 a recess 34 is provided so that the detent lug projects through a recess in the counterpart, onto which the restoring spring 13 is pushed, (for example recess 20 of the guide clip 15), and hence engages partially into the recess 34.

As may be seen in FIGS. 5 and 6, the transitional regions 26 and 30 are denoted in each case by recesses 34, 36. These recesses also project into the immediately adjoining regions of the limbs 28, 32 and/or of the base portion 22. Otherwise, however, the limbs 28, 32 are designed free of recesses and substantially rectilinearly. The recesses 34, 36 are design features, by means of which the connecting regions 26, 32 are purposefully weakened. By said means the deformation limits are determined, which for the respective connecting region 26, 30 define the transition from elastic to plastic deformation in dependence upon the effective forces. The recesses 34, 36 in the illustrated example are dimensioned in such a way that different deformation limits arise for each connecting region. In the illustrated embodiment the deformation limit of the connecting region 30 is selected so as to be lower than that of the region 26. It is self-evident that this also means that the degree of elastic deformation in the connecting region 30 is initially greater than that of the connecting region 26.

Thus, under the effect of a force F according to the arrow F in FIG. 6 upon actuation of the disc brake 9, i.e. upon a movement of the brake lining arrangement 11 in the direction of the arrow F, the angle β between the limbs 28 and 32 is reduced. An increase of the force F, and/or a greater deformation of the restoring spring 13 as a result of an increasing lining wear, results in the deformation limit of the connecting region 30 being exceeded. As a result the angle β between the limbs 28 and 32 is permanently reduced as a consequence of the plastic deformation of the restoring spring 13. The point of application of the limb 32 on the brake lining arrangement 11 is accordingly also shifted in the direction of the arrow F. The restoring position of the brake lining arrangement that arises as a result of an elastic relaxation of the restoring spring 13 therefore likewise shifts in actuating direction in accordance with the plastic deformation, which is determined by the compensated lining wear. This effect is intensified when the deformation limit of the connecting region 26 is also exceeded. In the illustrated example this occurs only after the limb 32 has been plastically deformed towards the limb 28. There is then a plastic deformation behaviour for wear compensation, in which parallel in time the angle α increases and the angle β decreases until the two limbs 28 and 32 finally position themselves one against the other in the actuating situation. A further plastic deformation as a rule does not occur. At least two defined limits may therefore be provided, at which the restoring spring 13 plastically deforms in order to compensate brake lining wear.

It should be noted that the restoring spring 13 following such a deformation substantially retains its elastic spring-back capability and so the value of the restoring travel also remains substantially constant. Only the point of application of the restoring spring 13 on the brake lining arrangement 11 and hence the absolute position of the brake lining arrangement 11 after a completed restoring operation vary in a wear-related manner in that they are shifted in actuating direction.

Figure 9:
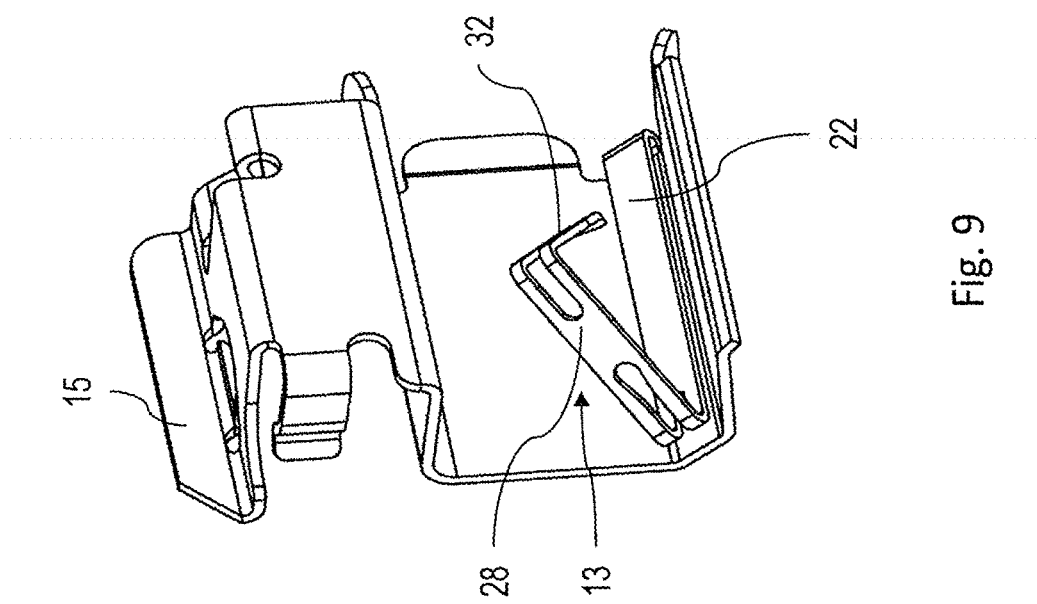
FIG. 9 is a perspective view of the combination of guide clip restoring spring according to the second embodiment.
Figure 8:
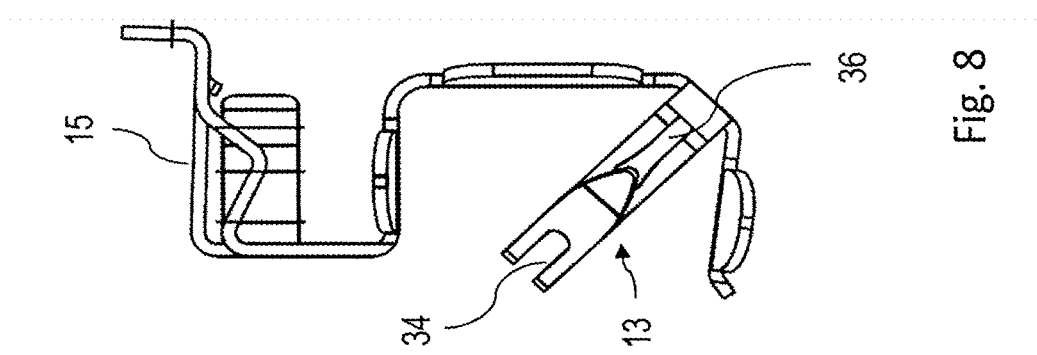
FIGS. 7 and 8 are rear and front views of a combination of guide clip and restoring spring according to a second embodiment, wherein the viewing axis corresponds to the axis of motion of the brake lining arrangement.
Figure 7:
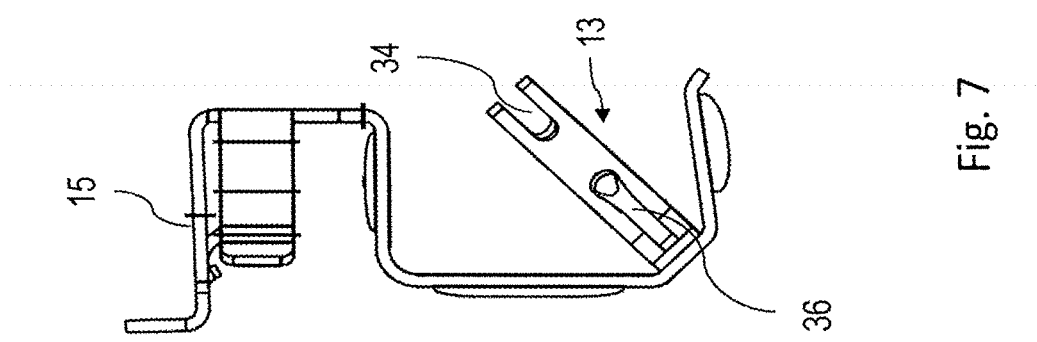

FIGS. 7 to 9 show a second embodiment of the restoring spring 13, wherein in comparison to the first embodiment components of an identical type or effect are provided with the same reference characters.

The essential difference is that the restoring spring 13 is not designed as a separate component but is formed integrally on the guide clip 15. The fastening mechanisms by means of the detent lug 24 and the clamping portion 21 therefore no longer apply. The elements crucial to the spring response as well as the recesses 34 and 36 defining the deformation limits are however retained. The spring in this case is initially of a two-dimensional construction and is then bent into the base portion 22 and the limbs 28, 32.

In the second embodiment the restoring spring 13 and the guide clip 15 are manufactured by shaping from a common, initially flat component. This flat component is represented on its own in FIG. 10 and denoted by 40. It is evident that the restoring spring 13 and guide clip 15 initially take the form of substantially elongate portions 44 and 46 of the component 40. In this case the respective portions 44 and 46 already for the most part have the basic contours and recesses in accordance with the finished combination of restoring spring 13 and guide clip 15 shown in FIGS. 7 to 9. Thus, for example the previously described recesses 34 and 36 may be seen in the portion 44.

To manufacture the unit of restoring spring 13 and guide clip 15 according to the second embodiment the flat component 40 is bent around a plurality of bending axes, the position of which may be gathered from a combined viewing of the finished shaped component shown in FIGS. 7 to 9. It is self-evident that in this case for example in the course of combined stamping-/bending processes further changes may be made to the contour or further recesses may be introduced.

Figure 10:
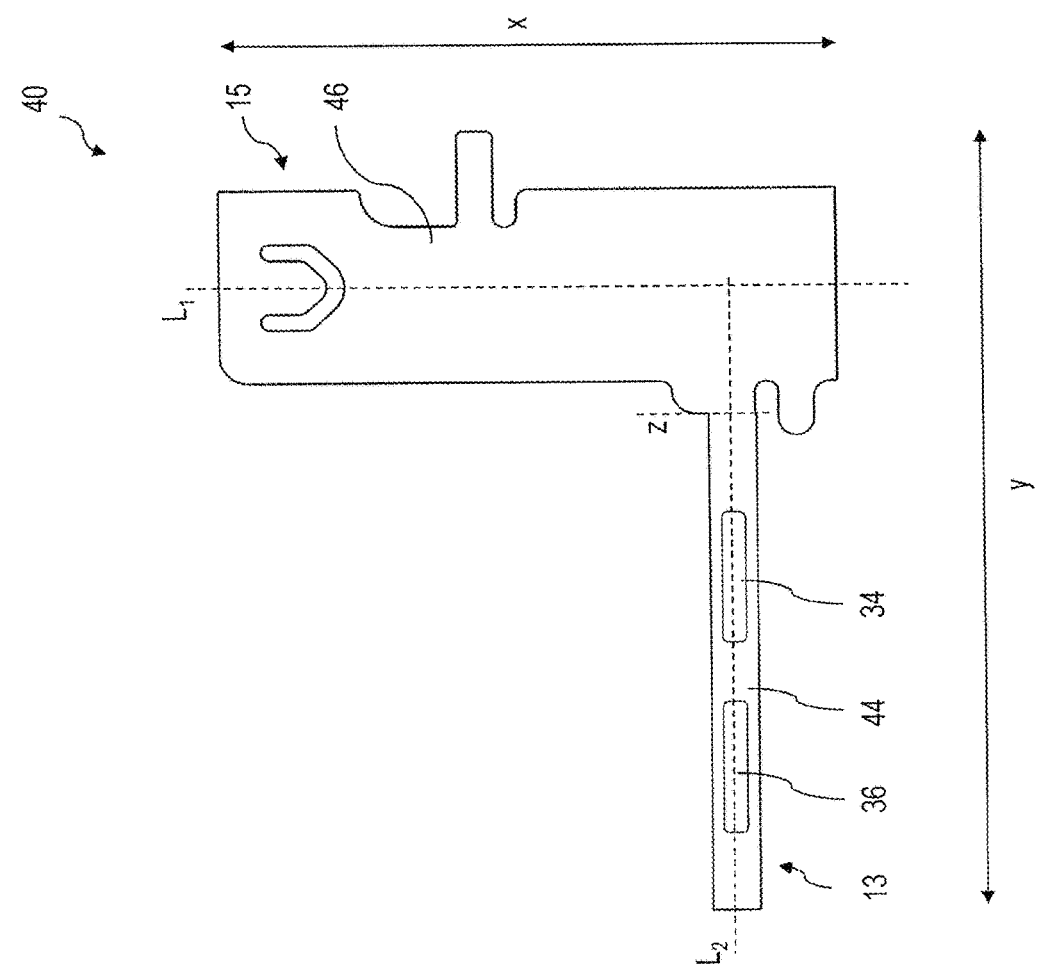
FIG. 10 is a view of a flat component for the manufacture by shaping of a combination of restoring spring and guide clip according to the second embodiment.

In the flat state shown in FIG. 10 it is evident that the portions 44 and 46, from which the guide clip 15 and restoring spring 13 are subsequently formed, extend along a respective longitudinal axis $L_1$ and $L_2$. In this case the elongate portion 44 and/or the longitudinal axis $L_1$ thereof extends at right angles to the longitudinal axis $L_2$ of the elongate portion 46. During shaping of the component 40 the portion 44 is therefore bent relative to the portion 46 in particular around a bending axis denoted in FIG. 10 by z, which runs at right angles to the longitudinal axis $L_1$ of the portion 44. It is further evident that the flat component 40 has two main dimensions y and x, which crucially define a material surface area of sheet metal that is needed to manufacture the component 40. In this case it may be seen from FIG. 10 that the component 40 takes up only a relatively small proportion of the spread-out material surface area, with the result that the material scrap that arises when the component 40 is cut or stamped out of this surface area is relatively high.

Figure 11:
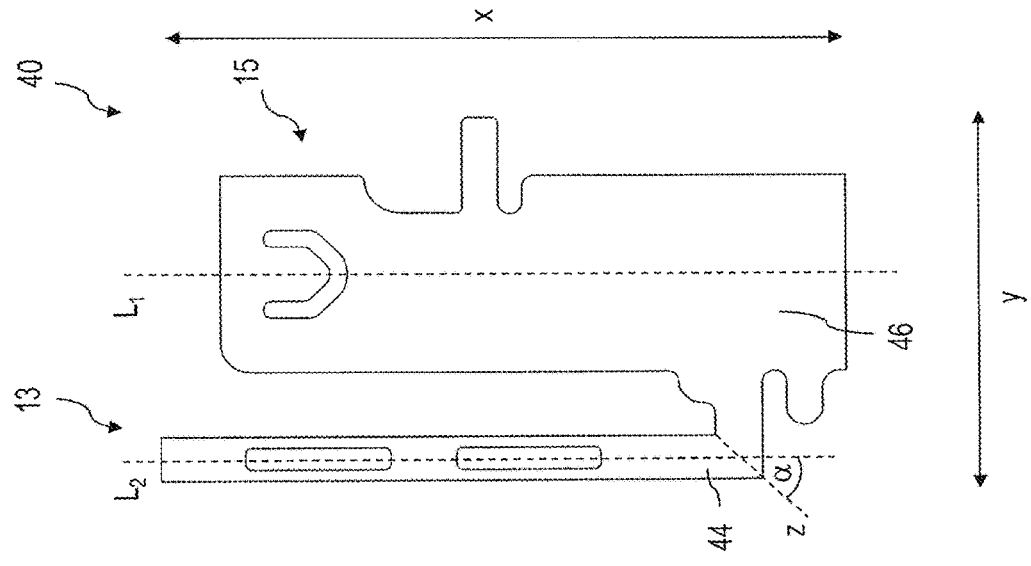
FIG. 11 is a view of a flat component for the manufacture by shaping of a combination of restoring spring and guide clip according to a third embodiment.

In comparison to this, FIG. 11 shows an alternative development of a flat component 40 according to a third embodiment of the invention. In this case the elongate portions 44 and 46 as such are of an identical construction to the example in FIG. 10. In this embodiment, however, the longitudinal axes $L_1$ and $L_2$ are aligned parallel to one another. Accordingly the surface area portions 44 and 46 extend substantially in a common direction and the spread-out required material surface area is smaller, particularly in the transverse direction y, than in the previous example of FIG. 10. The component 40 according to the third embodiment therefore takes up a comparatively high proportion of the spread-out material surface area and the scrap is markedly reduced.

The bending axis z, around which the surface area portion 44 is bent relative to the portion 46, extends in this embodiment at an angle α of 45° relative to the longitudinal axis $L_1$ of the surface area portion 44. This enables the restoring spring 13 in the third embodiment also to be aligned in the same manner relative to the guide clip 15 and the actuating direction as in the examples discussed above.

Figure 13:
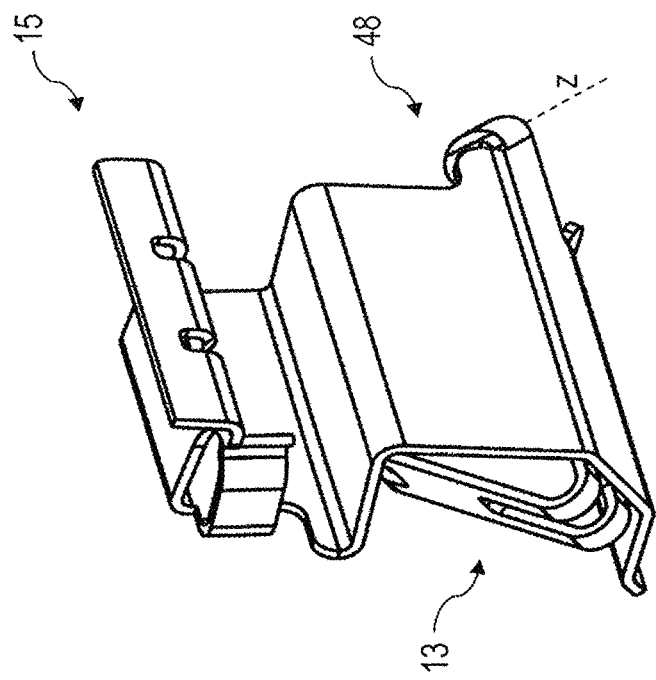
FIG. 13 is a further perspective view of the representation of FIG. 12.
Figure 12:
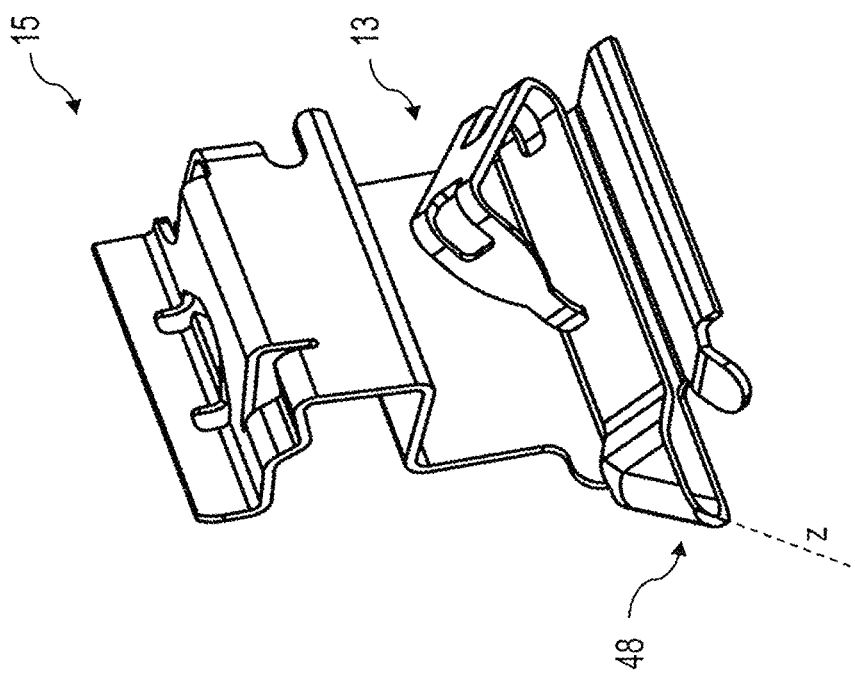
FIG. 12 is a perspective view of the combination of guide clip and restoring spring according to the third embodiment that is manufactured by shaping the flat component of FIG. 11.

A finished shaped unit according to the third embodiment is shown in FIGS. 12 and 13. Evident once more are the obliquely extending bending axis z and the portions of the restoring spring 13 that lie adjacent thereto. In order to increase the stiffness of the region bent around the bending axis z and avoid local concentrations of stress, the restoring spring in this region is configured with a curvature 48, which is likewise produced in the course of the shaping process.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A flat sheet metal component configured for manufacturing a brake clip for use with a disc brake of a motor vehicle brake system comprising:
   a first elongate portion having a first longitudinal axis, the first elongate portion configured to be shaped to form a first portion of the brake clip; and
   a second elongate portion having a second longitudinal axis, the second elongate portion configured to be shaped to form a second portion of the brake clip;
   wherein the first and second longitudinal axes of the first and second elongate portions of the flat sheet metal component are oriented substantially parallel to one another whereby the first and second elongate portions extend substantially in a common direction;
   wherein a bending axis, around which the second elongate portion is shaped relative to the first elongate portion, extends at an angle of approximately 45 degrees relative to the second longitudinal axis of the second elongate portion, and wherein the brake clip manufactured from the flat sheet metal component has the second elongate portion bent around the bending axis such that the second elongate portion forms the restoring spring.

2. The flat sheet metal component of claim 1 wherein the first elongate portion is configured to be shaped to form a guide clip portion of the brake clip.

3. The flat sheet metal component of claim 1 wherein the second elongate portion is configured to be shaped to form a restoring spring portion of the brake clip.

4. The flat sheet metal component of claim 1 wherein the first elongate portion is configured to be shaped to form a guide clip portion of the brake clip and the second elongate portion is configured to be shaped to form a restoring spring portion of the brake clip.

5. The flat sheet metal component of claim 1 wherein the flat sheet metal component defines a first dimension, that extends in a common direction with the first and second longitudinal axes, and a second dimension, that extends perpendicular to the first and second longitudinal axes, wherein the first dimension is greater than the second dimension.

\* \* \* \* \*